Patented Dec. 2, 1930

1,783,738

UNITED STATES PATENT OFFICE

THOMAS H. McKEOWN, OF METUCHEN, NEW JERSEY, ASSIGNOR, BY MESNE ASSIGNMENTS, TO THE ROESSLER & HASSLACHER CHEMICAL COMPANY, A CORPORATION OF DELAWARE

OPACIFIER FOR ENAMELS

No Drawing. Application filed January 12, 1928. Serial No. 246,397.

This invention relates to the manufacture of white vitreous enamels and has for its object the development of an enamel utilizing a relatively inexpensive opacifier which will impart to the enamel a desirable white color. A further object is to provide such an enamel particularly suited for use on sheet metal, such as sheet iron and sheet steel.

My invention consists in providing enamel mixtures containing sodium antimonate and tin oxide as opacifier. I have tried various mixtures of sodium antimonate and tin oxide in a number of varied formulæ, but I have found that the best results are secured if the two constituents are present in a more or less restricted ratio to each other. I have found that the sodium antimonate-tin oxide ratios should be approximately 3:1. If this ratio is altered in either direction the enamel in which it is used does not have the desired opacity and physical properties. I have found that in the enamels of my invention this 3:1 mixture can be utilized in amounts sufficient to give desired opacity and color, and still not render the enamel brittle or increase its tendency to chip off, i. e. the proper cubical expansion of the enamel necessary to secure the proper adherence to the sheet iron or steel under temperature changes can be obtained even with high amounts of this opacifier.

I have further discovered that to secure the proper adherence and other desirable qualities in such enamels several components must be used in more or less definite proportions. The following example gives these components in the preferred proportions and the variable allowances which may be made in the components to secure small variations in the expansion coefficient to conform to the sheet steel. The individual coefficients of expansion of the components are given in the literature so that having the basic formula given here below the desired composition can be made up to fit any particular sheet steel.

In this example and in the appended claims my opacifier is referred to as "antimony-tin opacifier", and the amount required denotes the amount of 3:1 mixture used.

Sheet steel enamel formula

| | Preferred frit formula | Variable frit allowances |
|---|---|---|
| Feldspar (parts by wt.) | 25.2 | 24 to 27 |
| Flint (parts by wt.) | 16.9 | 15 to 18 |
| Borax (parts by wt.) | 25.0 | 23 to 27 |
| Soda nitre (parts by wt.) | 3.0 | 1 to 4 |
| Soda ash (parts by wt.) | 4.1 | 3 to 5 |
| Cryolite (parts by wt.) | 13.9 | 11 to 14 |
| Fluorspar (parts by wt.) | 2.9 | 2 to 5 |
| Whiting (parts by wt.) | 3.0 | 1 to 4 |
| Antimony tin opacifier (parts by wt.) | 6.0 | 1 to 12 |
| | 100.0 | |

Mill batch

| | Preferred batch formula | Variable allowances |
|---|---|---|
| Enamel frit (parts by wt.) | 100.0 | 100 |
| Clay (parts by wt.) | 6 | 4 to 6 |
| Antimony tin opacifier (parts by wt.) | 2 | 1 to 8 |
| $MgSO_4$ plus $7H_2O$ (parts by wt.) | .5 | .4 to .8 |
| Water (parts by wt.) | 35 | 25 to 40 |

The powdered materials of the frit formula are mixed by hand or mechanically, and then fused; the melt is dropped into water to cool and shatter after which it is placed in the ball mill together with the remaining constituents of the mill batch. These materials are then ground together in the mill to a fineness best suited for the particular method of application to be used; this fineness will be generally between about 30–70 mesh.

In using this enamel on sheet steel an under coating or a binding coat is first applied to the article. This undercoat may be any of the well known coat compositions suited for the articles which are commonly used. These undercoats are essentially an enamel glass composition containing no opacifier, and preferably containing cobalt oxide and manganese oxide. The undercoating is first applied to the steel and burned on, or fired, at a temperature somewhat higher than that required to mature the enamel given above. This temperature will be above about 850° C. After burning the undercoating and cooling the article, the enamel slurry or paste is applied by any suitable means, such as dipping or spraying; the article is then dried and burned at a temperature of about 850° C. A period of about 5 minutes at the maturing temperature is usually satisfactory. When thus burned the above enamel has the following empirical formula when calculated on a basis wherein the sum of the sodium, potassium and calcium oxides is equal to one.

| | Mols. |
|---|---|
| $Na_2O$ | 0.730 |
| $K_2O$ | 0.062 |
| $CaO$ | 0.208 |
| $Al_2O_3$ | 0.279 |
| $B_2O_3$ | 0.384 |
| $Sb_2O_3$ | 0.038 |
| $SiO_2$ | 1.770 |
| $SnO_2$ | 0.033 |
| $F_2$ | 0.404 |

The coefficient of expansion obtained with the preferred formula is $329.2 \times 10^{-7}$.

The variable compositions allowable in this flux will result in fluxes having a variable composition by weight approximately as follows:

| | | | |
|---|---|---|---|
| $Na_2O$ | 12 | to | 18 |
| $K_2O$ | 2 | to | 2.2 |
| $CaO$ | 2.5 | to | 6.0 |
| $Al_2O_3$ | 8.6 | to | 11.0 |
| $B_2O_3$ | 8.4 | to | 10.0 |
| $Sb_2O_3$ | 0.6 | to | 8 |
| $SiO_2$ | 33 | to | 40 |
| $SnO_2$ | 1 | to | 8 |
| $F_2$ | 4 | to | 6 |

In the above formulæ it will be noted that the opacifier allowances cover a wide range; the actual amount to be used depends on the opacity desired. In the above example part of the opacifier has been added in the enamel formula and part in the mill batch. This, however, is an optional procedure and depends upon the color desired in the enamel. The opacifier can all be added to the raw frit formula before smelting, or it can all be added to the mill batch, or it can be distributed between the two batches in the amounts indicated above or in any other desired distribution. If all of the opacifier is added to the mill batch the resulting enamel will have a slight creamy tint, whereas if all of the opacifier is added to the raw frit batch before smelting a bluish white enamel results; if the opacifier is distributed between the two batches the tint will vary between the two extremes in about the ratio of the additions.

While I have explained the opacifier as being a definite mixture of the two materials, I have found that it is not necessary to actually mix or grind the antimonate and tin oxide together before adding them to the enamel. I have found that the opacifying results are equally well secured if, for example, the two were mixed prior to the addition of the enamel, or whether they were added separately, the only requirement being that the ratio approximately be maintained. Furthermore, I have found that all of the antimonate can be added to the raw frit formula and the tin oxide added to the mill batch. Regardless of how the two materials are added any deviation from the ratio 3:1 is immediately apparent by a change in the appearance and properties of the enamel. It can be seen from the above I do not wish to be limited to the manner of adding my opacifying mixtures to the enamel. The sodium antimonate of my antimony tin opacifier may be supplied by pure sodium antimonate as such, or I may use the material commonly known in the art as leukonin which consists chiefly of sodium antimonate, and therefore in the appended claims, I wish it understood that sodium antimonate is intended to cover such mixtures, and the term "antimony tin" opacifier is intended to cover such materials as leukonin in combination with tin oxide as well as the pure material. It is to be noted that in the fired enamel composition as given above that the antimony oxide and tin oxide are present in a ratio of approximately 1:1.

Formulæ suited for wet and dry process cast iron enameling embodying my invention are given in my copending applications Serial No. 246,399 and Serial No. 246,398 respectively filed of even date herewith.

Claims:

1. Method of producing a clouding or opacifying effect in white enamels which comprises incorporating with the enamel sodium antimonate and tin oxide in approximately the ratio of three parts by weight of sodium antimonate to one part of tin oxide.

2. An enamel composition comprising:

*Frit formula*

| | Parts by weight |
|---|---|
| Feldspar | 24 to 27 |
| Flint | 15 to 18 |
| Borax | 23 to 27 |
| Soda nitre | 1 to 4 |
| Soda ash | 3 to 5 |
| Cryolite | 11 to 14 |
| Fluorspar | 2 to 5 |
| Whiting | 1 to 4 |
| Antimony-tin opacifier (3:1) | 1 to 12 |

*Mill batch*

| | Parts by weight |
|---|---|
| Enamel frit | 100 |
| Clay | 4 to 6 |
| Antimony-tin opacifier (3:1) | 1 to 8 |
| $MgSO_4$ plus $7H_2O$ | .4 to .8 |
| Water | 25 to 40 |

3. An enamel composition comprising:

*Frit formula*

| | Parts by weight |
|---|---|
| Feldspar | 25.2 |
| Flint | 16.9 |
| Borax | 25.0 |
| Soda nitre | 3.0 |
| Soda ash | 4.1 |
| Cryolite | 13.9 |
| Fluorspar | 2.9 |
| Whiting | 3.0 |
| Antimony-tin opacifier (3:1) | 6.0 |
| | 100.0 |

*Mill batch*

| | Parts by weight |
|---|---|
| Enamel frit | 100.0 |
| Clay | 6 |
| Antimony-tin opacifier (3:1) | 2 |
| $MgSO_4$ plus $7H_2O$ | .5 |
| Water | 35 |

4. A fired enamel having a composition by weight approximately as follows:

| | Parts by weight |
|---|---|
| $Na_2O$ | 12 to 18 |
| $K_2O$ | 2 to 2.2 |
| CaO | 2.5 to 6.0 |
| $Al_2O_3$ | 8.6 to 11.0 |
| $B_2O_3$ | 8.4 to 10.0 |
| $Sb_2O_3$ | 0.6 to 8 |
| $SiO_2$ | 33 to 40 |
| $SnO_2$ | 1 to 8 |
| $F_2$ | 4 to 6 | wherein sodium antimoniate and tin oxide are utilized in the requisite amount in the preparation of the composition for firing and in the ratio to each other of 3 to 1.

5. A fired enamel having the following empirical formula:

| | Mols |
|---|---|
| $Na_2O$ | 0.730 |
| $K_2O$ | 0.062 |
| CaO | 0.208 |
| $Al_2O_3$ | 0.279 |
| $B_2O_3$ | 0.384 |
| $Sb_2O_3$ | 0.038 |
| $SiO_2$ | 1.770 |
| $SnO_2$ | 0.033 |
| $F_2$ | 0.404 |

6. An enamel composition for the production of white enamel containing sodium antimonate and tin oxide in ratios of three to one.

7. A fired white enamel containing antimony oxide and tin oxide in ratios of approximately one to one.

Signed at Perth Amboy, in the county of Middlesex and State of New Jersey, this tenth day of January, A. D. 1928.

THOMAS H. McKEOWN.